Nov. 19, 1968    A. HEIDT    3,412,260
ELECTRICAL DRIVE MEANS, PARTICULARLY FOR SEWING MACHINES
Filed Sept. 18, 1964

Inventor:
ALFRED HEIDT
BY Robert H. Jacob
AGT.

United States Patent Office 3,412,260
Patented Nov. 19, 1968

3,412,260
ELECTRICAL DRIVE MEANS, PARTICULARLY FOR SEWING MACHINES
Alfred Heidt, Schwetzingen, Baden, Germany, assignor to Frankl & Kirchner, Schwetzingen, Baden, Germany
Filed Sept. 18, 1964, Ser. No. 397,528
Claims priority, application Germany, Sept. 20, 1963, F 40,807
3 Claims. (Cl. 307—112)

ABSTRACT OF THE DISCLOSURE

Drive control means for a machine having a clutch and a brake with control circuits including transistors controlling the clutch and the brake winding and with a speed control switch and a position control switch in the brake transistor circuit which cooperate to disengage the coupling and brake the machine only in a predetermined position of the position control switch.

Background of the invention

The present invention relates to drive means for use particularly in sewing machines having an electrically controllable clutch connected between a continuously rotating motor and the driven part and an electrically controllable brake, with means for stopping the drive in a predetermined position.

It has already been proposed to control the clutch of drive means of this type and the brake which is effective when the clutch is released by means of one or more transistors in a manner that the circuit means which must be actuated in the control circuits for stopping the drive means and the magnetic coils of the clutch and of the brake are disposed in the operating circuit or circuits of the transistors. The stopping operation in such an arrangement preferably takes place in such a manner that as the operation is initiated the clutch is released by being disconnected and the brake means are connected in order to bring the driven part to a stop within one or a few rotations. If by coincidence the driven part should not happen to be in the predetermined position, the brake is automatically released and the drive is again connected, and the driven part is moved on under the control of a switching device which depends for operation on the position of the driven part until it has reached the correct position. In this position the brake is finally drawn up while the clutch is disconnected. In accordance with this proposal this operation is controlled by circuit means which are time controlled.

It is an object of the present invention to simplify the foregoing arrangement by using circuit means which depend for operation on a predetermined number of rotations.

In accordance with the invention the transistors which actuate the brake and the clutch, upon initiating the stopping operation, are connected by way of their control circuits with a switching device which depends on rotations, a switching device depending on position as well as with one another, in such a manner that above a predetermined limiting number of rotations of the driven part the clutch is released and the brake remains drawn up, while below this limiting number the clutch is engaged and the brake released in order to move the driven part on to the predetermined stopping position, and as this position has been reached the clutch is again released under the control of its transistor while the brake is finally drawn up under the control of its transistor. The use of control means depending on numbers of rotation provides the advantage over the time controlled circuit means, that the transistor circuit need not be adjusted to the time constant of the particular drive means.

In the circuit described in the following example of an embodiment of the invention only two transistors are provided, one of which operates a brake, the other a clutch. In the control circuit of one transistor a switching device depending on position and a switching device depending on centrifugal force are connected in parallel. The circuits of the two transistors are coupled with one another in such a way that one of them is conductive only when the other is nonconductive, and vice versa.

Brief description of the drawings

The advantages and details of the features of the invention will become more apparent with reference to the drawings, in which.

Description of the invention

Figure 1:
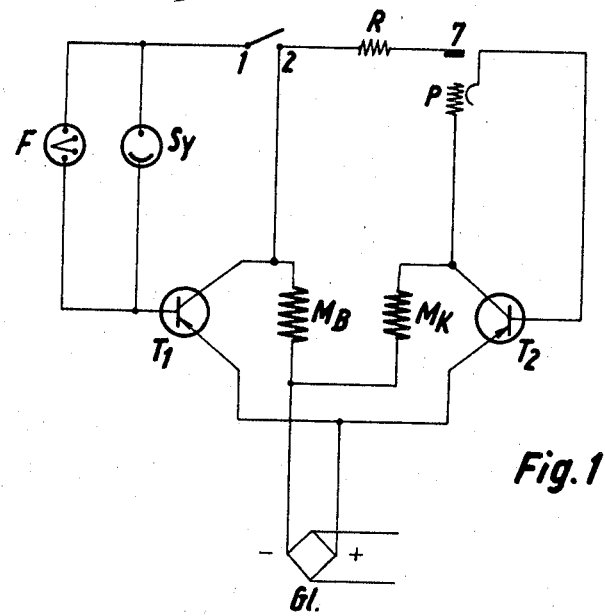
FIG. 1 illustrates the basic circuit of the drive means in accordance with the invention.

In FIG. 1 the inductance winding MB is provided for the brake acting on the driven part of the driving means and the winding MK is for a clutch which connects the driven part with the continually rotating driving motor. The brake winding MB is in the operating circuit of the transistor $T_1$, the clutch winding MK is in the operating circuit of a transistor $T_2$. Here the emitter-collector circuits of these transistors are provided as operating circuits; however all types of other transistor circuits known per se can be employed, if desired in cascade. A rectifier $G_1$ constitutes the current supply source for the circuit.

A pair of contacts 1, 2 which may be shunted, if desired, are disposed in the control circuit of the transistor $T_1$ in series with a parallel circuit comprising the centrifugal force switch F and switch Sy which is coupled with the driven part, and which is controlled by or responds to a predetermined position. The centrifugal force switch F can be accommodated in the housing of the switch Sy.

An optionally operable potentiometer P having an end contact 7 is connected in the control circuit of the transistor $T_2$, which contact is connected by way of a resistor R to the circuit of the transistor $T_1$. Contacts 1, 2 and the potentiometer P, 7 may be combined in a starting device or circuit element such as a foot switch.

During the operation of the machine that is being driven contacts 1, 2 are open as shown in FIG. 1, so that the base of the brake transistor $T_1$ cannot receive a negative potential with respect to its emitter. Consequently this transistor is blocked and the brake magnet is cut off. The base of the clutch transistor $T_2$ is connected by way of potentiometer P to the collector of this transistor and is supplied with the required negative potential. Therefore, in this condition this transistor is condutive. The base current and thus the collector current and the clutching force can be regulated by means of the potentiometer P.

In order to stop, the drive contacts 1, 2 are closed and the sliding contact of P is moved to end contact 7, thus connecting the base of the brake transistor $T_2$ by way of contact 7 and resistor R with the collector of the brake transistor $T_1$.

The centrifugal force switch F in the control circuit of transistor $T_1$ is at first closed. It is constructed in a manner that it opens only at a low number of rotations of the driven part or, due to the mass inertia of its structural components, only when it comes to a standstill. In a sewing machine the last mentioned condition will occur only when it is braked from the maximum stitch number of 6000/min. to zero. During slower sewing the centrifugal force switch opens at a stitch number of 100/min.

During the braking operation the centrifugal force switch is therefore closed, and thus the base of transistor $T_1$ is connected with its collector. As a result transistor $T_1$ is conductive and energizes the brake magnet MB. The base of transistor $T_2$ is connected by way of contact 7, resistor R and the operating circuit of transistor $T_1$ to the emitter so that the transistor $T_2$ is blocked and the winding of the clutch becomes de-energized. Consequently the released machine is braked until the centrifugal switch F opens as the lower limit of numbers of rotation is reached. This condition affords two possibilities:

If the driven part of the sewing machine, is in the desired position, then the synchroniser $Sy$ makes contact. In that case the brake magnet MB remains energized and the machine is stopped in that position. Thus the braking operation is terminated. The resistance R is proportioned in such a manner that the base current of transistor $T_2$ is insufficient to make it conductive.

If the driven part of the machine is not in the predetermined stopping position, the synchroniser $Sy$ does not make contact. Thus the base of the transistor $T_1$ is free and the transistor is blocked. With the centrifugal switch F open the circuit is under control of the synchroniser $Sy$.

The base of the transistor $T_2$ is now supplied with sufficient current by way of the winding MB of the brake magnet and resistor R to render the transistor $T_2$ conductive; consequently the clutch magnet MK is energized and the drive motor continues to rotate the machine until the synchroniser $Sy$ makes contact. During the further rotation the centrifugal switch F remains open. As a result of the closing of the contact of the synchroniser transistor $T_1$ becomes conductive, thus energizing the brake magnet MB, while at the same time the clutch transistor $T_2$ is blocked. Now the drive is in the desired position, where it is stopped.

The circuit elements are proportioned in a manner that the two transistors can become conductive or block only under the control of one by the other, and that in a manner that one transistor is conductive while the other is in blocked or non-conductive condition, and vice versa. Thus the condition cannot arise that both transistors are simultaneously conductive.

Figure 2:
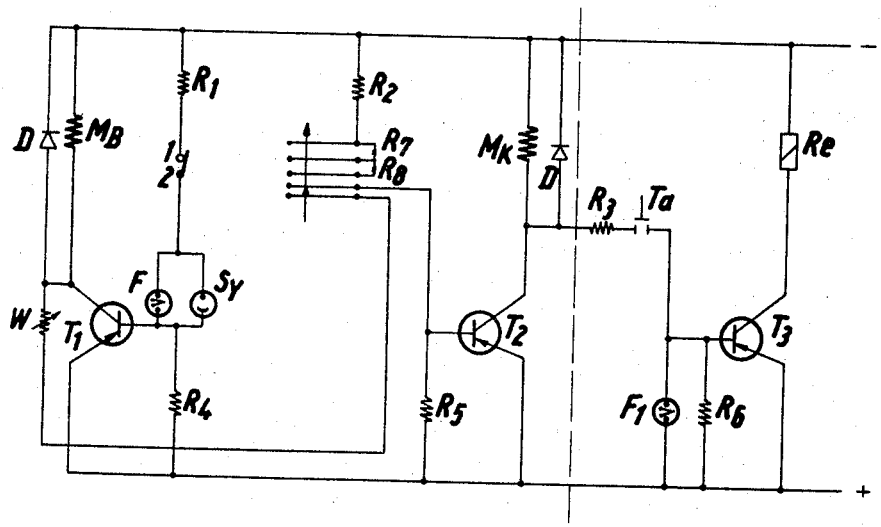
FIG. 2 is a more extensive circuit diagram adapted for sewing machine drive means which incorporates also the transistor control of a thread cutter.

In FIG. 2 the arrangement of a practical embodiment of this control circuit is illustrated where the circuit means at the left of the interrupted line corresponds to the circuit of FIG. 1. For the purpose of obtaining a desired temperature compensation the base potentials are derived from the potential dividers $R_1$, $R_4$, respectively $R_2$, $R_5$. In order to avoid uncontrollable conditions by an exposed base, each base is connected to the associated emitter by way of a resistor $R_4$ or $R_5$. Diodes D are connected in parallel with magnet windings MB and MK for short circuiting the inductive potentials of the windings when the magnets are disconnected so that no dangerous potential peaks can occur. The variable resistance P with the end contact 7 of FIG. 1 is replaced in FIG. 2 by stepping resistors $R_7$, $R_8$ which are operated by contact blades. In addition, a variable control resistor W is provided in lieu of resistor R, by means of which the clutching force can be controlled during the continuing rotation of the driven part.

The circuit arrangement described also makes it possible to include in a very advantageous manner the circuit means for operating a thread cutter to be operated as the drive of the sewing machine is stopped. An associated circuit for actuating and disconnecting the thread cutter circuit is shown to the right of the interrupted line in FIG. 2. This circuit is operated by means of a further transistor $T_3$ and a relay $Re$. The base of this transistor $T_3$ is connected on the one hand by way of an optionally operable switch, for example a push button switch $Ta$, and a resistor $R_3$ to the collector of transistor $T_2$, and on the other hand, by way of a resistor $R_6$ to the emitter of transistor $T_3$. The components are proportioned in a manner that when the clutch transistor $T_2$ is conductive, the base current of $T_3$ is insufficient to open this transistor. In the operating condition during sewing and during continuing rotation, operation of the thread cutter circuit is therefore not possible. In order to prevent its operation also during the braking period from maximum stitch number downwardly an additional centrifugal switch $F_1$ is provided between the base of transistor $T_3$ and its emitter which is of the same construction as centrifugal switch F. Therefore, as long as centrifugal switch $F_1$ is closed there is no potential difference between the base of $T_3$ and the emitter so that also in this condition transistor $T_3$ cannot become conductive.

Only when the desired position of the machine is reached and the brake magnet has been energized and the clutch magnet deenergized can the thread cutting circuit be operated by actuating the manual switch $Ta$.

It is also possible to connect the transistor $T_3$ which controls the thread cutter circuit to the circuit of the transistor $T_1$ which actuates the brake in a manner that during the running condition of the machine it is in a condition to block the thread cutter circuit. The conditions which apply to the thread cutter circuit are also applicable to equivalent devices on other textile machines.

Having now described my invention with reference to the embodiment illustrated in the drawings, I do not wish to be limited thereto, but what I desire to protect by Letters Patent of the United States is set forth in the appended claims.

I claim:

1. Electrical drive control means for driven means such as a sewing machine adapted to be coupled to a continually rotating motor, said means comprising a clutch having a clutch winding and a brake having a brake winding, said clutch being adapted to be operatively interposed between the motor and the driven means, and means for stopping said driven means in a predetermined position including a brake transistor having a base, a collector and an emitter disposed in a brake control circuit and a clutch transistor having a base, a collector and an emitter connected in a clutch control circuit including contact circuit means disposed between one end of said clutch winding and the clutch transistor base operative to supply current to said clutch winding, switch means operative to connect said clutch transistor control circuit to said brake transistor control circuit and one end of said brake winding to said brake transistor circuit, the other ends of said clutch winding and said brake winding being connected to a common source of current supply, said brake transistor control circuit including a speed controlled switch and a position responsive switch, said speed controlled switch and said position responsive switch being mounted for rotary movement with said driven means and connected in parallel between the brake transistor base and by way of said switch means to said brake winding and operative upon initiating the braking operation by said switch means in a manner that above a predetermined number of rotations said speed controlled switch is closed and said clutch transistor is nonconductive, whereby said clutch is disengaged and the brake is engaged, and below said predetermined number of rotations said clutch transistor is conductive and the clutch is engaged while said brake transistor is non-conductive and the brake is released to permit said driven part to be moved to a predetermined stopping position where said position responsive switch makes contact, said clutch releases under control of said clutch transistor and said brake is finally drawn up under control of said brake transistor.

2. Electrical drive control means for driven means such as a sewing machine adapted to be coupled to a continually rotating motor, said means comprising a clutch having a clutch winding and a brake having a brake winding, said clutch being adapted to be operatively interposed between the motor and the driven means, and means for stopping said driven means in a predetermined position including a brake transistor having a base, a collector and an emitter disposed in a brake control circuit and a clutch transistor having a base, a collector and an emitter connected in a clutch control circuit including contact circuit means disposed between one end of said clutch winding and the clutch transistor base operative to supply current to said clutch winding, switch means operative to connect said clutch transistor control circuit to said brake transistor control circuit and one end of said brake winding to said brake transistor circuit, the other ends of said clutch winding and said brake winding being connected to a common source of current supply, said brake transistor control circuit including a speed controlled switch and a position responsive switch, said speed controlled switch and said position responsive switch being mounted for rotary movement with said driven means and connected in parallel between the brake transistor base and by way of said switch means to said brake winding and operative upon initiating the braking operation by said switch means in a manner that above a predetermined number of rotations said speed controlled switch is closed and said clutch transistor is nonconductive, whereby said clutch is disengaged and the brake is engaged, and below said predetermined number of rotations said clutch transistor is conductive and the clutch is engaged while said brake transistor is non-conductive and the brake is released to permit said driven part to be moved to a predetermined stopping position where said position responsive switch makes contact, said clutch releases under control of said clutch transistor and said brake is finally drawn up under control of said brake transistor, said brake transistor control circuit and said clutch transistor control circuit being coupled in a manner that each transistor is conductive only when the other is blocked, said drive control means further including a thread cutter control circuit including a thread cutter transistor connected to one of the other transistor circuits and acuating means operative to render said thread cutter control circuit inoperative during the running condition of the machine controlled by said other circuits, said actuating means comprising a switch operative in its position of rest to block said thread cutter transistor.

3. Drive control means in accordance with claim 2 wherein said speed controlled switch is connected in said thread cutter control circuit intermediate the base and the emitter of said thread cutter transistor.

References Cited

UNITED STATES PATENTS

| | | | |
|---|---|---|---|
| 2,914,010 | 11/1959 | Cohen | 112—252 |
| 2,961,591 | 11/1960 | Frankel et al. | |
| 3,160,128 | 12/1964 | Heidt. | |
| 3,187,701 | 6/1965 | Heidt et al. | 192—142 X |
| 3,268,047 | 8/1966 | Grygera et al. | |

ROBERT K. SCHAEFER, *Primary Examiner.*

T. B. JOIKE, *Assistant Examiner.*